US008711009B2

(12) United States Patent
Broman et al.

(10) Patent No.: US 8,711,009 B2
(45) Date of Patent: Apr. 29, 2014

(54) ICE DATA COLLECTION SYSTEM

(75) Inventors: Rolf Christer Broman, Houston, TX (US); Dom P. Berta, Katy, TX (US); Khalid A. Soofi, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 249 days.

(21) Appl. No.: 13/104,608

(22) Filed: May 10, 2011

(65) Prior Publication Data
US 2011/0291862 A1 Dec. 1, 2011

Related U.S. Application Data

(60) Provisional application No. 61/349,478, filed on May 28, 2010.

(51) Int. Cl.
*G08B 23/00* (2006.01)
(52) U.S. Cl.
USPC .............................. 340/984; 340/985; 340/540
(58) Field of Classification Search
USPC .......................................................... 340/984
See application file for complete search history.

(56) References Cited

U.S. PATENT DOCUMENTS

| 4,808,036 A | 2/1989 | Bhalaik et al. |
| 5,122,990 A | 6/1992 | Deines et al. |
| 5,224,800 A | 7/1993 | Mogridge et al. |
| 5,381,694 A | 1/1995 | Glynn et al. |
| 5,585,799 A | 12/1996 | Yankielun et al. |
| 6,167,831 B1 | 1/2001 | Watt et al. |
| 6,700,528 B2 | 3/2004 | Williams et al. |
| 7,095,359 B2 | 8/2006 | Matsuoka et al. |

FOREIGN PATENT DOCUMENTS

| GB | 2223642 | 4/1990 |
| GB | 2223642 | 11/1990 |
| JP | 6130484 | 2/1986 |
| WO | WO 9603662 A2 * | 2/1996 |
| WO | 0121479 | 3/2001 |
| WO | 2007143457 | 12/2007 |

OTHER PUBLICATIONS

PCT Notification of Transmittal of the International Search Report and The Written Opinion of the International Searching Authority, or the Declaration, International Application No. PCT/US2011/035942, Filing Date: May 10, 2011, 13 pages, Sep. 2011.
Strass, "Measuring sea ice draft and coverage with moored Upward Looking Sonars," Deep-Sea Res, vol. 45:795-818 (1998). doi:10.1016/S0967-0637(97)00065-4.
Harms, et al., "AWI moored ULS data, Weddell Sea (1990-1998)." Boulder, CO: National Snow and Ice Data Center/World Data Center for Glaciology (2001).
Wadhams, et al., "A new view of the underside of Arctic sea ice," Geophys. Res. Lett., 33, L04501, doi:10.1029/2005GL025131. (2006).

(Continued)

*Primary Examiner* — Kerri McNally
(74) *Attorney, Agent, or Firm* — ConocoPhillips Company

(57) ABSTRACT

Unmanned Underwater Vehicles (UUV) collect and transmit information about ice floes with respect to their areal extent, vertical underwater profile, thickness, density, location, speed, direction and other properties to determine the possible trajectory of the ice floe. This information is used to alert drilling platforms in icy ocean conditions of pending ice floe dangers.

27 Claims, 3 Drawing Sheets

(56) References Cited

OTHER PUBLICATIONS

Theriault, et al., "Survey of Active Acoustic Monitoring (AAM) Technologies." Int'l Assoc. Oil & Gas Prod. (OGP) 1: (2009).

Hyatt, et al., "Estimating sea-ice coverage, draft, and velocity in Marguerite Bay (Antarctica) using a subsurface moored upward-looking acoustic Doppler current profiler (ADCP)," Deep Sea Research Part II: Topical Studies in Oceanography, 55:351-64 (2008). http://dx.doi.org/10.1016/j.dsr2.2007.11.004.

* cited by examiner

ICE DATA COLLECTION SYSTEM

CROSS-REFERENCE TO RELATED APPLICATIONS

This application is a non-provisional application which claims benefit under 35 USC §119(e) to U.S. Provisional Application Ser. No. 61/349,478 filed May 28, 2010, entitled "ICE DATA COLLECTION SYSTEM," which is incorporated herein in its entirety.

FEDERALLY SPONSORED RESEARCH OR DEVELOPMENT

None.

FIELD OF THE INVENTION

This invention relates to systems for detecting and characterizing ocean ice floes.

BACKGROUND OF THE INVENTION

Because the demand for oil and gas continues to grow, safer and more reliable methods of developing oil and gas fields need to be developed. Producing gas from the Arctic Ocean provides unique challenges, especially as drilling moves into deeper water depths, faces more severe ice conditions, and as well complexity increases.

Ice floe detection has been developed using a variety of ice monitoring systems. Strass (1998) derive ice draft and coverage from acoustic measurements made with moored Upward Looking Sonars (ULSs) sounding the sea surface remotely from below. Harms, et al., (2001) use moored ULS data to measure sea ice draft. Wadhams, et al. (2006) developed an autonomous underwater vehicle (AUV) for under-ice studies with unmanned under-ice vehicle and a multibeam sonar. Hyatt, et al., (2008) use upward-looking acoustic Doppler current profiler (ADCP) to determine ice coverage with moored systems. (Theriault, et al., 2009).

Johnson, GB2223642, describes methods of tracking the movement of sea-ice using successive images from orbiting satellites. Deines and Maier, U.S. Pat. No. 5,122,990, indicate that a signal echo may be used in an upward looking configuration to measure the movement of sheets of ice in one of the polar regions. Glynn, et al., U.S. Pat. No. 5,381,694, provide a relatively inexpensive reflectometer apparatus that can measure the thickness of material such as ice. Yankielun and Ferrick, U.S. Pat. No. 5,585,799, pertains to a microwave continuous wave (CW) Doppler radar system for river ice motion detection and real-time kinematic data acquisition using digital signal processing equipment. Matsuoka, et al., U.S. Pat. No. 7,095,359, describe an ice thickness/drifting velocity observation of sea ice by using an ice thickness measurement sonar and a current meter moored into the sea and a sea ice observation by a high-resolution airborne SAR are synchronously performed to calculate a correlation between a draft profile of sea ice passing over the sonar and an SAR backscattering coefficient profile. Williams and Yankielun, U.S. Pat. No. 6,700,528, provide a compact and relatively inexpensive motion detection and alerting system implemented in a single, environmentally secure and benign package. Although a variety of ice floe monitoring equipment has been developed, these systems are limited to small areas, fixed positions within the ocean or near the equipment, or limited in the amount of time available.

Oil and gas companies wishing to drill and develop an oil or gas field in the offshore Arctic Ocean need to know on a near continuous basis what kind of ice environment they are dealing with. In the Alaska and Beaufort Canadian areas of the Arctic Ocean, the ice is usually composed of "floes", large bodies of ice that may extend up to several hundred square miles in area and 100 feet in thickness. These floes move around in a somewhat erratic and unpredictable fashion. Although satellite imaging can be used to track ice floes on a near-continuous basis and predict with certain probabilities where they are heading, as well as measuring their area in the x and the y direction (FIG. 1), the third dimension, the thickness of the ice floe, cannot be measured satisfactorily. What is required is a method to measure and monitor on a continuous bases large areas of the ice floes including detailed the under-ice topography that describes the depth, mass, speed and direction of the ice floes.

BRIEF SUMMARY OF THE DISCLOSURE

The invention more particularly includes an integrated system using multiple sources, multiple data types, and a variety of tools to accurately monitor sea ice movement and thickness over a very large area with increased accuracy. Ice floes are located and tracked in the Arctic seas on a near continuous basis, by using satellite imagery, Unmanned Underwater Vehicles (UUV), Remote Operated Vehicles (ROV), underwater buoys, or a combination of these systems. They will collect and transmit information about the ice floes with respects to their areal extent, vertical underwater profile, thickness, density, location, speed, direction and other properties measured by the vehicles.

A system for monitoring ice floe movement is described for a drilling structure with one or more UUVs containing ice floe survey equipment; and a control unit for receiving data from ice floe survey equipment. The UUV typically has an electric motor, one or more batteries, one or more control processors, and one or more data storage devices to power the UUV, collect ice floe survey data, and store the data until it can be retrieved from the UUV.

In one embodiment, a process for monitoring ice floe movement where one or more UUVs are programmed to conduct an ice floe survey; one or more UUVs is launched from a UUV launch location, the UUVs conduct an ice floe survey, the underwater ice floe survey data is retrieved from the UUV, and the ice floe survey is analyzed for ice floes of interest.

In another embodiment, a remote ice floe monitoring system is described for a drilling structure with a tether comprising one or more UUV docking stations; one or more unmanned underwater vehicles (UUV) with ice floe survey equipment; and a control unit for receiving data from one or more UUV docking stations. A UUV docking station may connect with one or more UUVs with a power connection and a data connection to transmit ice floe survey information from the UUV to the docking station.

Systems may employ UUVs with automated obstacle avoidance systems, on-board positioning systems, sonar sensors, processors, antennae, global positioning systems (GPS), long term and/or short term data storage, removable media, camera, avoidance systems, location systems, echo-locators, homing systems, a variety of other equipment for measuring environmental conditions, calculating topography of ice floes, and/or other environmental features. Ice floe survey equipment is available for UUVs including laser imaging detection and ranging (LIDAR), sound navigation and ranging (SONAR), upward looking SONAR (ULS), backscatter, and combinations thereof. Standard and specialized batteries are available including alkaline batteries, lithium batteries, long life batteries and the like. UUVs may be launched or retrieved from a platform, drilling structure, ice breaker, ice management ship, underwater docking station, shore based docking station, artificial island, remote station, or combinations thereof.

The ice floe survey systems provide warning of possible ice floe collisions. Warnings include possible and probable contact with ice floes, ice floes of interest, and hazardous ice floes. Advance warnings may be approximately 1, 2, 3, 4, 5, 7.5, 10, 12.5, 15, 18, 24, 48 or 72 hour in advance of incoming ice floes. The ice floes may be classified based on risk including speed, mass, density, age, trajectory, currents, weather, predicted path, and other environmental features. Satellite imagery and analysis may be used with UUV monitoring of ice floes to assess speed, mass, density, age, trajectory, currents, weather, predicted path, or other environmental features. The system may include an automated alert system that warns the drilling structure of probable contact with an ice floe, instructs one or more ice breakers to respond to possible contact with an ice floe, instructs personnel on the drilling structure to cease drilling operations in response to possible contact with an ice floe, instructs personnel on the drilling structure to evacuate in response to probable contact with an ice floe, monitors ice floe approach, monitors personnel response, monitors drilling shut down, monitors well head uncoupling, and other safety features that can identify hazards, identify the probability of a hazard, issue a warning, monitor response, or ensure warning compliance.

A warning system comprising multiple UUVs with underwater topography and ice floe monitoring equipment is required because current underwater surveys will not cover enough area to provide adequate warning system. In the sensitive arctic environment, the drilling wells must be shut down prior to a collision with a hazardous ice floe. Enough warning must be present to allow drilling personnel to stop the current drilling procedure, remove all fluids from the drill line, prepare personnel and equipment for evacuation and remove the drilling equipment prior to a collision with a substantial and hazardous ice floe. Because advance warning is required and ice floe trajectory is difficult to predict, the UUVs must cover a very large area up to 100 miles from the drilling platform and other structures. This can only be achieved with an integrated UUV monitoring system than can cover large areas to investigate ice floes of interest.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
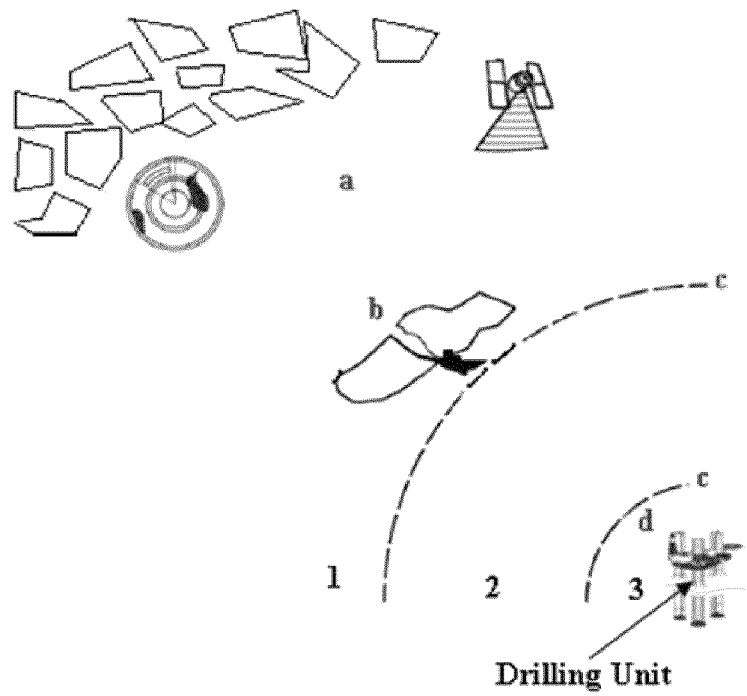
FIG. 1: Ice Floe Tracking System with Satellites.
Figure 2:
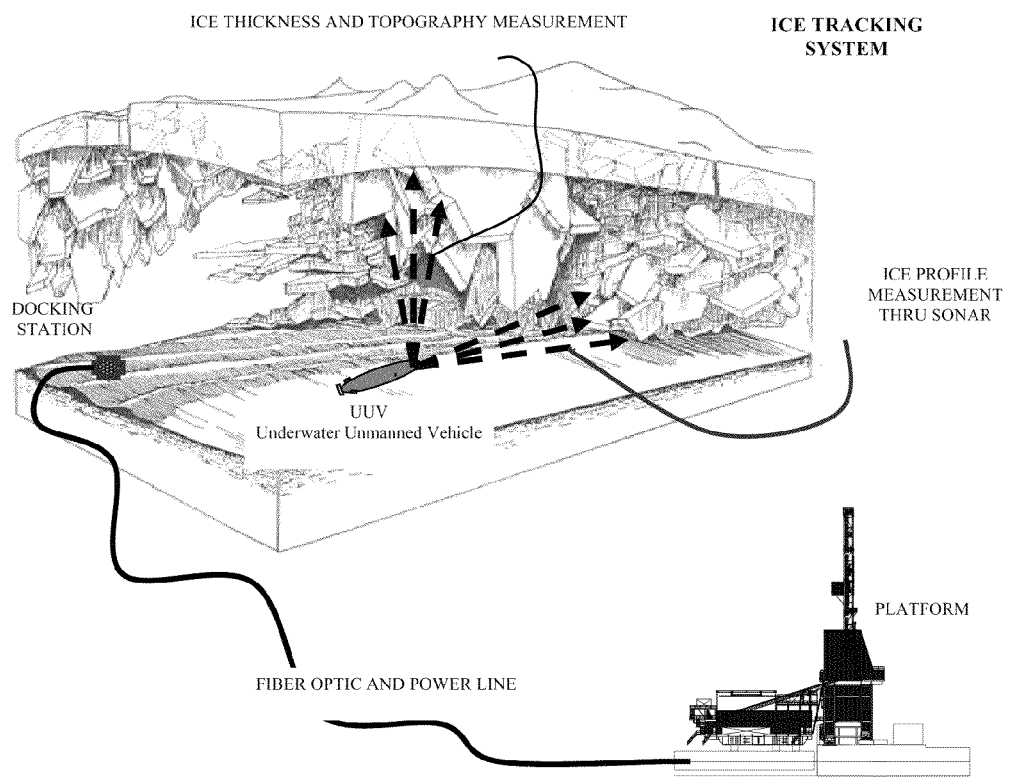
FIG. 2: Under Ice Profile and UUV.

Underwater Unmanned Vehicles (UUV) also called autonomous underwater vehicles (AUV) can be used to image undersea topography across a large area (FIG. 2). UUVs are automated micro submarines anywhere from less than a foot to up to 20 feet or more in length (some larger UUVs may be 7 to 10 M in length and up to 3 meters in diameter). UUVs are battery powered and may have automated obstacle avoidance systems, on-board positioning systems, and sonar sensors to measure the time and distance between other UUVs and the underwater ice profile. They are automated in the sense that they are given instructions to follow a certain trajectory and come back. In one embodiment one or more UUV launch systems may be used including from the platform where the operation and drilling take place; from an ice breaker, barge or separate control ship that stays in the vicinity of the platform; or from fixed docking stations that reside on the sea-floor. Fixed docking stations may be laid on the sea floor, they may be tethered to underwater structures, or they may be tethered to the platform or control ship.

Previously UUVs were used to make detailed maps of the seafloor, construct and maintain subsea infrastructure including pipelines and sub sea completions in a cost effective manner with minimum disruption to the environment. UUVs are available from a variety of commercial and private sources including the REMUS 100 UUV from Woods Hole Oceanographic Institution and Hydroid, Inc.; the HUGIN 1000 and 3000 UUVs from Kongsberg Maritime and Norwegian Defence Research Establishment; the Bluefin Robotics 12 and 21 inch diameter vehicles, ALISTER AUV from ECA HYTEC™ and the International Submarine Engineering Ltd. Explorer, as well as vehicles by Lockheed-Martin, BlueView Technologies, Inc., Autonomous Undersea Systems Institute (AUSI), C & C Technologies, Cybernetics, and others. UUVs may be constructed with various radar, sonar, laser, backscatter and upward looking systems for visualizing and mapping various underwater environments dependent upon available light, depth, water quality, and the weight and size of the UUV. Batteries may be developed to reduce the UUV weight or for longevity of the battery. As batteries improve by decreasing weight, increasing longevity, increasing the number of recharges and decreasing charge time, UUV surveys become longer, faster, and the area covered increases. UUVs may contain a variety of different functions including processors, antennae, global positioning systems (GPS), long term and short term data storage, removable media, camera, avoidance systems, location systems, echo-locators, homing systems, and the like.

An "ice floe" is a flat mass of ice floating in a body of water. Ice floes may include smaller floating ice structures such as icebergs, individual ice sheets, or groups of icebergs and ice sheets. Ice floes may also be larger masses such as ice fields. Ice floes may be thin sheets of ice or may be thicker pieces of ice with substantial underwater topography. Ice floes can vary in density from loosely packed snow accumulations to large thick sheets of dense fresh or salt water ice. Ice floes may originate from glaciers, larger ice fields, first year ice sheets, multi-year ice sheets and other ice sources. The identification of ice floes of different sizes is complicated as the amount of ice increases. Increasing ice coverage decreases the area visible to radar, satellite, and other imaging techniques. As ice coverage limits visibility the danger posed by large ice masses increases because reaction time is inhibited and available responses are restricted. Ice floe speed may also change the dangers posed by an ice floe. Typically, an ice floe travels slowly, exerting pressure due to constant movement and not rapid speed. Ice floes may not make detectable movements in packed ice or may move at up to 0.2 knots (approximately 0.23 mph or 0.37 km/h). In some embodiments an ice floe may move at greater than 0.4 knots (about 0.5 mph or 0.74 km/h) dependent upon the ocean currents, winds, shape of the ice floe, and other environmental factors.

Figure 4:
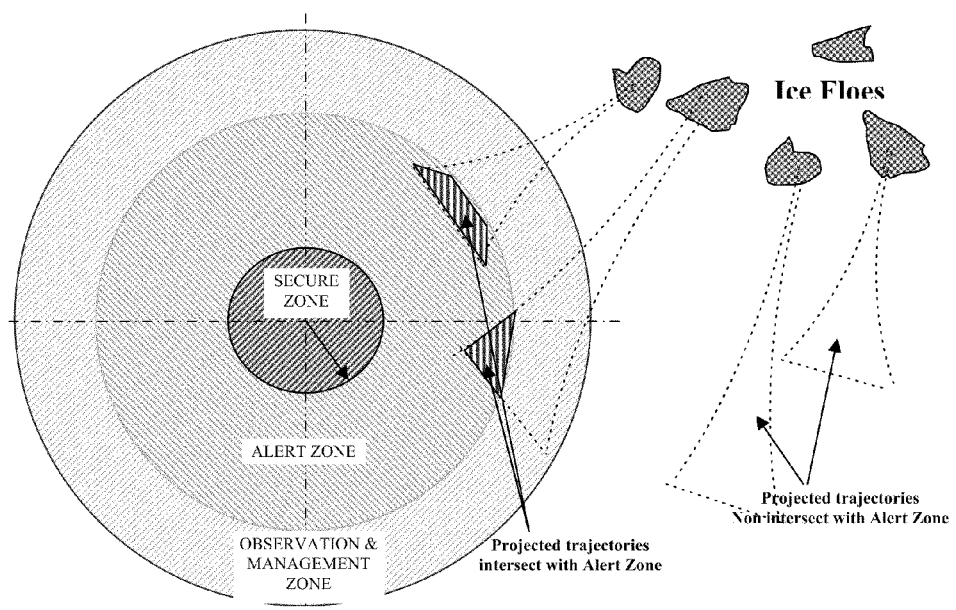
FIG. 4: Possible Direction "Cones" for ice-floes.

Stresses in the ice floe may create different ridging and rafting patterns that may make the ice thicker or thinner in different areas. Pressure ridging, shear ridging, and fracturing may influence the ice formation and change the rheology of the ice floe. The ice floe topology must be analyzed to determine the thickness, density, properties, mass and overall threat of the ice floe to drilling structures, ships, ports, and other structures that may be on or exposed to sea ice. In FIG. 4 the probabilistic nature of the floe direction at one point in time is demonstrated. One can see that some floes can be discarded as they have very little or no possibility of entering the alert zone, and will not have sufficient time to impact the structure within the alert time, while some have to be tracked continuously because they may possibly or will probably impact the structure. Typically satellite imagery can be used to identify ice floes and predict ice floe movement. Unfortunately, satellite imagery is inconsistent as satellites are frequently out of range in the Northern Arctic and Southern Antarctic regions and there may be gaps where imagery is unavailable for several hours or days. The ice floes can be identified from satellite imagery, the area of the ice floe can be determined, the direction of travel can be estimated, and future trajectories can be predicted. The cones in FIG. 4 show possible ice floe direction based on satellite images and travel prediction algorithms. Time zero is set at the end of the summer when the first ice floes appear within a circle of 100 nautical miles of the platform.

The platform may be one of many different structures including a variety of drilling rigs, floating rigs, ship based rigs, jack-up rigs, fueling stations, floating platforms, docks, ports, temporary islands, artificial islands, shipping lanes, and the like. The platform may even contain multiple different structures that are fixed and floating with or without access and pipes between the different structures. Frequently, the platform may include a variety of vessels and structures including drilling ships or floating rigs, supply ships, chain ships or barges, one or more ice breakers, floating processing ships, ships or barges for drill cuttings and other wastes, and tankers to carry produced liquids or gases, as well as ships, platforms and barges that may serve multiple functions. Additionally, the barges or ships may be interchanged depending upon the weather, water conditions, ice floe dangers, type of well, processes being conducted and other factors that influence drilling.

Platforms are designed to resist a certain mass, thickness and velocity of ice floe dependent upon the design of the platform and environmental conditions. If however the platform were exposed to pressures above a certain threshold, personnel may be evacuated, pipelines flushed or shut down, drilling operations stopped, shutoff valves closed, and the like, so that no oil is spilled in the water or on the ice. In the case of jack-up rigs, the rig may be raised or lowered dependent upon the size of the approaching ice and danger posed to the drilling operations.

Ice breakers are ships designed to penetrate ice sheets and break up the ice flow. A variety of ice breakers are known that can break-up ice of varying thicknesses and densities. Dependent upon the type of ice and available ice breakers, one or more ice breakers may be used to break up, move or change the direction of the ice floe.

Zones around the structures may be measured in distance, time, or probability of collision. A variety of time, distance or other cautionary domains may be established either individually or in overlapping zones. As the risk of collision increases or the time before collision decreases, various actions may be undertaken including preventative actions, precautionary actions, shut-down, and evacuation. Zones may include observation zones, alert zones, safety zones, security zones and the like. In one embodiment, ice floes above a target size may be identified if they enter the "observation zone." This indicates further scrutiny where the ice floe is monitored for direction and speed. Risk of collision may be assessed after an ice floe enters the observation zone. The "alert zone" may be set up where specific responses are prescribed for ice floes that are identified entering the alert zone. A "secure zone" may be an area where actions are to be completed before an ice floe enters the secure zone.

Preventative measures, precautionary measures, and other actions may be undertaken in response to various positions and directions of ice floe movement. Preventative measures may include activation of ice breakers to break-up or move ice floes, ice breaking buoys may be deployed, or the rig may be raised or lowered to better withstand the force of the ice. Precautionary measures may include shutting off and/or detaching drilling equipment, closing shutoff valves, staging for evacuation, and evacuation. Ice gear and safety equipment may be deployed if required or if a threat is present.

The following examples of certain embodiments of the invention are given. Each example is provided by way of explanation of the invention, one of many embodiments of the invention, and the following examples should not be read to limit, or define, the scope of the invention.

Example 1

In one embodiment, platform based UUVs are launched when an ice floe is identified. If the ice floe has one possible trajectory that may make it hazardous to the platform, a UUV launched from the platform is sent to the remote location where the ice floe is located. In one embodiment, a long range UUV may be launched with a radio transmitter. The UUV will assess the size, thickness and direction of the ice floe. Upon completion of the ice floe survey, the UUV will then attempt to surface within or near the ice floe of interest, this may be accomplished by identifying areas of no ice coverage within the survey area. Once the UUV surfaces within the ice floe of interest, it may transmit ice floe information directly to the platform or to one or more remote locations like a ship or receiving buoy. Not only will the ice floe thickness survey be transmitted via direct radio communication, but the ice floe location can be tracked with a low energy beacon. Once the hazardous ice floe has cleared the platform, the UUV may be retrieved by an ice breaker or other means. Alternatively, if no surface location is available, the UUV may return to the platform to download the survey.

Example 2

In another embodiment, ice breakers in service around the platform to protect it from the ice also carry one or more UUVs. The UUVs are deployed from the ice breaker when an ice floe of interest is identified. In one embodiment, one ice breaker may be designated for ice floe management. The ice breaker is deployed to a distant location once the ice floe is identified. The UUV is released from that location and intercepts the ice floe. Once the ice floe is surveyed the UUV may return to the ice breaker. In one embodiment an underwater signal is used as a beacon to draw the UUV back to the ice breaker. In another embodiment, the UUV returns to a predetermined location to await retrieval. In yet another embodiment, the ice breaker may return to the UUV launch site for retrieval. The UUV may be launched and retrieved from any number of shipboard methods including moonpools, booms, winches, towed docking stations, or simply by tow line.

Additionally, one or more ice breakers may be used for each survey. Each ice breaker may carry, launch and recover numerous UUVs. In one embodiment the ice breaker may carry 5 UUVs. In another embodiment a variety of ice breakers carry one or two UUVs for launch. The UUVs may be later retrieved by one or more retrieval boats. The number of UUVs, the number of Tracking Stations and the location of Tracking Stations, may be determined based on the average speed of the ice floe, distance of ice breaker travel, distance of UUV travel and life span of the UUV battery. Remote tracking stations, either on ice breakers, at land masses, or fixed positions in the water may be deployed to increase UUV distance and retrieval. Tracking stations may also be used to define or modify UUV trajectories before they are launched or during a survey. Tracking stations may be used to triangulate UUV position, ice breaker position, platform position, and provide "safe" returns if UUV retrieval is disrupted. Ice breaker and UUV trajectory, including drop off and pick up, are optimized to cover as much as an area as possible, reduce the time of survey, and reduce the distance traveled.

Example 3

Figure 3:
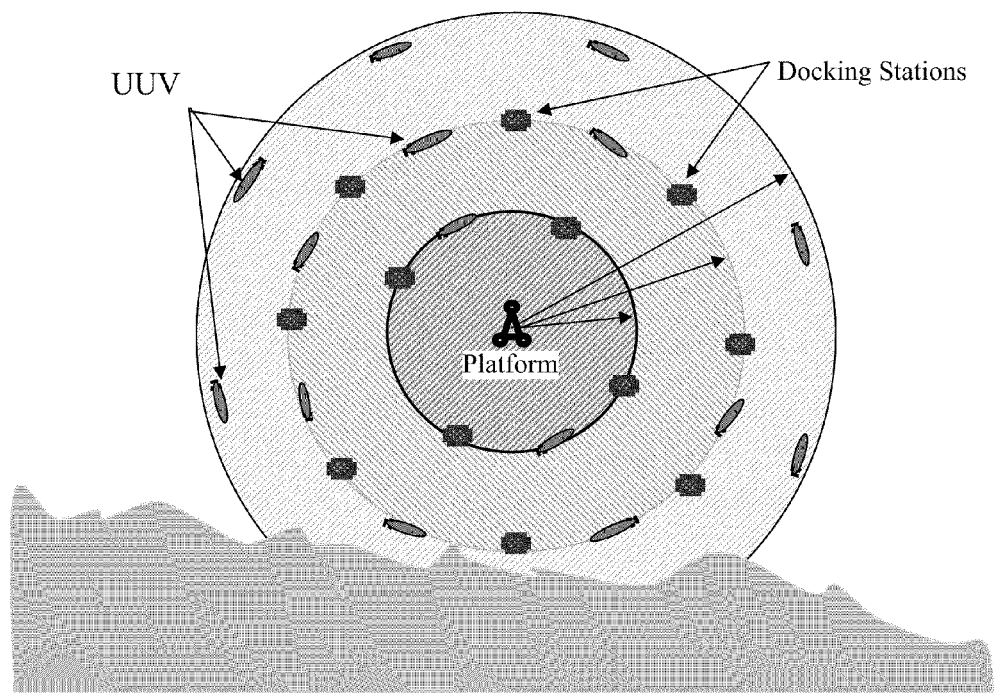
FIG. 3: Docking Stations and UUVs.
Figure 5:
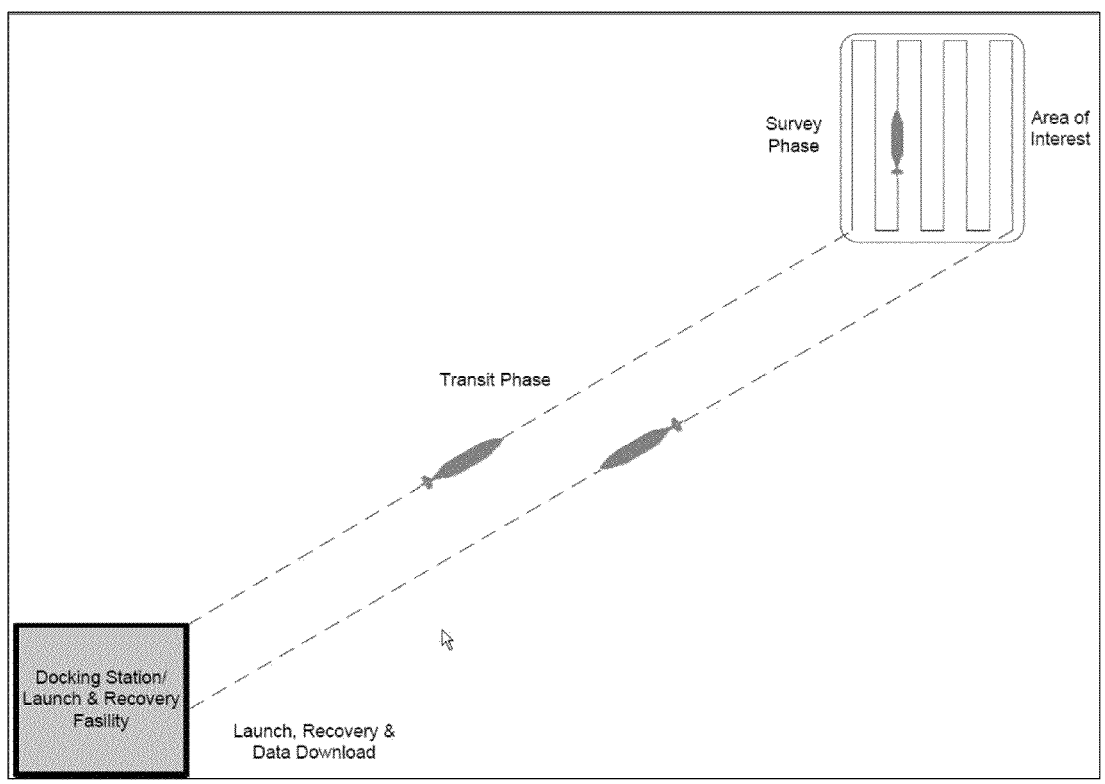
FIG. 5: Baseline Survey Mission (courtesy of Kongsberg).

In another embodiment, docking stations are fixed on the sea bed. The docking system may be connected to the platform and can include a power source, data transmission wires, fiber optic systems, pressure sensors and the like. One or more UUVs may dock at a docking station for recharging, data download, or for "sleep" between surveys. UUVs are programmed to download the data they have stored on their memory and upload power to the batteries when docked as well as receive and transmit instructions, conditions, diagnostic information and the like. UUVs are programmed so that they "remember" where the docking stations are located and travel to the docking station if at any time communications are disrupted, the survey is unable to be completed, battery life is low, damage occurs, or other factors interfere with normal operations. FIG. 3 demonstrates one possible scenario of the location of the docking stations and the trajectory of the UUVs. Docking stations may be located at a specific distance from the platform or at locations based on terrain. In one embodiment docking stations are located at approximately 10 miles from the platform structure. In another embodiment an outer position is maintained by an ice management station, boat, or ice breaker allowing location of the docking station up to 100 miles in from the platform. The docking station may also be located close to the platform, thus reducing the length of communication and power lines. Inversely, the docking station may be located off of a remote island, peninsula or other land based feature. Because ice floes may move in different directions and speeds, docking stations may be placed asymmetrically. In one embodiment, UUV docking stations would be placed in the prevailing current at 10 to 40 miles from the platform, while short range docking stations may be placed at 1 to 10 miles from the platform on sides where the prevailing current will not drive the ice floe rapidly into the platform. Frequently, the ice floes must still be monitored on all sides of the platform due to the unpredictable nature of ice floe trajectory, localized currents, changes in wind direction, and other environmental factors. In one embodiment several docking stations are mounted on the sea floor 80 miles from the platform. At each docking station up to 5 UUVs are stationed with separate loading sites for each UUV such that all 5 UUVs may be docked at the same time. Then, once an ice floe of interest is identified via satellite, radar, or other survey, one or more UUVs are dispatched to assess the underwater topology, thickness and other ice floe parameters. The UUV collects upward looking sonar data from under the ice floe as shown in FIG. 5. Once the ice floe has been surveyed, the UUV returns to the docking station where the survey is downloaded and transmitted to either the platform or an ice management ship for analysis. The ice floe is then classified as "not relevant," "of interest," or "hazardous" depending upon mass and rheology. If the ice floe is "of interest" or "hazardous" it may be monitored by one or more UUVs or it may be addressed by dispatching one or more ice breakers to influence the direction of the ice floe or break up the ice floe.

TABLE 1

Ice floe travel distance vs ice floe speed in knots.

| Knots | Hours | | | | |
|---|---|---|---|---|---|
| | 1 | 12 | 24 | 48 | 72 |
| 0.1 | 0.115 | 1.38 | 2.76 | 5.52 | 8.28 |
| 0.2 | 0.23 | 2.76 | 5.52 | 11.04 | 16.56 |
| 0.3 | 0.345 | 4.14 | 8.28 | 16.56 | 24.84 |
| 0.5 | 0.575 | 6.9 | 13.8 | 27.6 | 41.4 |
| 0.75 | 0.8625 | 10.35 | 20.7 | 41.4 | 62.1 |
| 1 | 1.15 | 13.8 | 27.6 | 55.2 | 82.8 |

In Table 1, ice floe distance is displayed in relation to ice floe speed in knots. This indicates that an ice floe traveling at 0.5 knots would have to be observed at approximately 40 miles to initiate a 72 hr shut down and evacuation. The average ice floe travels at approximately 0.25 knots, indicating that a 20 mile warning radius should be sufficient for most ice floes. A maximum speed of about 1 knot has been seen in ice floes and some may move faster under harsh weather conditions or if both wind and current simultaneously move the ice floe in the same direction.

Alternatively, one or more UUVs may be dispatched at all times to monitor ice floe movement. This is done to prevent unforeseen ice floe hazards. If the ice floes are monitored at 80 miles out, then the platform has up to 72 hours to respond to the fastest moving ice floes. This can be done by sending out UUVs to identify ice floes that reach below a certain depth with a range of the underwater docking station. The UUV can then report the ice floe at the end of screening a large area or upon contact with a larger ice floe. Upon return, one or more UUVs may be deployed to survey ice floes of interest to assess if the ice floe is a hazard, track ice floe movement and determine putative ice floe trajectories. The UUVs may be deployed in a variety of arrays dependent upon terrain, prevailing currents, prevailing winds, amount of ice pack, maximum speed of ice floes in the region, average speed of ice floes in the region, availability of other warning systems, platform location and platform type, as well as other factors that may affect the hazards presented by undetected ice floe movement.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Pat. No. 5,122,990, "Bottom Tracking System," Rowe-Deines Instr. Inc, Inv.: Deines (2/91).
2. U.S. Pat. No. 5,381,694, "Ice Thickness Measurement Reflectometer," Dedicated Electronics, Inv.: Glynn (9/92).
3. U.S. Pat. No. 5,585,799, "Microwave doppler radar system for detection and kinematic measurements of river ice," USA Dept. of Army, Inv.: Yankielun, (6/95).
4. U.S. Pat. No. 6,700,528, US2003034912, "Motion detection and alerting system," USA Dept. of Army, Inv.: Williams, (9/02).
5. U.S. Pat. No. 7,095,359, US2004143395, WO03048803, "Method of observing sea ice," Nat Inst Inf & Comm Tech., Inv.: Matsuoka (11/01).
6. GB2223642, "Tracking sea ice," Marconi Gec Ltd, Inv.: Johnson (10/88).
7. Harms, et al., "AWI moored ULS data, Weddell Sea (1990-1998)." Boulder, Colo.: National Snow and Ice Data Center/World Data Center for Glaciology (2001).
8. Hyatt, et al., "Estimating sea-ice coverage, draft, and velocity in Marguerite Bay (Antarctica) using a subsurface moored upward-looking acoustic Doppler current profiler (ADCP)," Deep Sea Research Part II: Topical Studies in Oceanography, 55:351-64 (2008). http://dx.doi.org/10.1016/j.dsr2.2007.11.004
9. Strass, "Measuring sea ice draft and coverage with moored Upward Looking Sonars," Deep-Sea Res, I 45:795-818 (1998). doi:10.1016/S0967-0637(97)00065-4
10. Theriault, et al., "Survey of Active Acoustic Monitoring (AAM) Technologies." Int'l Assoc. Oil & Gas Prod. (OGP) 1: (2009).
11. Wadhams, et al., "A new view of the underside of Arctic sea ice," Geophys. Res. Lett., 33, L04501, doi:10.1029/2005GL025131. (2006).

The invention claimed is:
1. A system for monitoring ice floe movement comprising:
   a) a drilling structure;
   b) one or more unmanned underwater vehicles (UUV) containing ice floe survey equipment for conducting an ice floe survey; and
   c) a docking station for receiving data from said ice floe survey equipment,
   wherein said UUV comprises an electric motor, one or more batteries, one or more control processors, and one or more data storage devices
   wherein the ice floe survey provides up to 72 hours warning of incoming ice floes.
2. The system of claim 1, wherein said UUV comprises one or more components selected from the group consisting of automated obstacle avoidance systems, on-board positioning systems, sonar sensors, processors, antennae, global positioning systems (GPS), long term and short term data storage, removable media, camera, avoidance systems, location systems, echo-locators, or homing systems.
3. The system of claim 1, wherein said ice floe survey equipment selected from the group consisting of laser imaging detection and ranging (LIDAR), sound navigation and ranging (SONAR), upward looking SONAR (ULS), backscatter, and combinations thereof.
4. The system of claim 1, wherein said one or more batteries consisting of alkaline batteries, lithium batteries, or long life batteries.
5. The system of claim 1, wherein said UUV is launched or retrieved from a platform, drilling structure, an ice breaker, ice management ship, an underwater docking station, a shore based docking station, artificial island, remote station, or combinations thereof.
6. The system of claim 1, wherein said ice floe survey provides approximately 1, 2, 3, 4, 5, 7.5, 10, 12.5, 15, 18, 24, 48 or 72 hour warnings of incoming ice floes.
7. The system of claim 1, wherein said ice floes are classified based on risk including one or more of the following: speed, mass, density, age, trajectory, currents, weather, predicted path, and other environmental features.
8. The system of claim 1, wherein satellite imagery and analysis of satellite images are coupled with UUV monitoring of ice floes, including calculation of one or more of the following: speed, mass, density, age, trajectory, currents, weather, predicted path, and other environmental features.
9. The system of claim 1, wherein said system comprises an automated alert system that includes one or more of actions including: warning the drilling structure of probable contact with an ice floe, instructing one or more ice breakers to respond to possible contact with an ice floe, instructing personnel on the drilling structure to cease drilling operations in response to possible contact with an ice floe, instructing personnel on the drilling structure to evacuate in response to probable contact with an ice floe, monitoring ice floe approach, monitoring personnel response, monitoring drilling shut down, or monitoring well head uncoupling, and the like.
10. A process for monitoring ice floe movement comprising:
   a) programming one or more unmanned underwater vehicles (UUV) to conduct an ice floe survey;
   b) launching said UUV from a UUV launch location,
   c) conducting an underwater ice floe survey whereby the UUV is sent to ice floes of interest;
   d) retrieving the ice floe survey from said UUV after it conducts an underwater ice survey, and
   e) transmitting the ice flow survey whereby the UUV attempts to surfaces within or near the ice floe of interest;
   f) analyzing the ice floe survey for ice floes of interest,
   wherein said UUV comprises an electric motor, one or more batteries, one or more control processors, one or more data storage devices, and one or more pieces of ice floe survey equipment
   wherein the ice floe survey provides up to 72 hours warning of incoming ice floes.

11. The process of claim 10, wherein said UUV comprises one or more components selected from the group consisting of automated obstacle avoidance systems, on-board positioning systems, sonar sensors, processors, antennae, global positioning systems (GPS), long term and short term data storage, removable media, camera, avoidance systems, location systems, or echo-locators, homing systems.

12. The process of claim 10, wherein said ice floe survey equipment selected from the group consisting of laser imaging detection and ranging (LIDAR), sound navigation and ranging (SONAR), upward looking SONAR (ULS), backscatter, and combinations thereof.

13. The process of claim 10, wherein said one or more batteries consist of alkaline batteries, lithium batteries, or long life batteries.

14. The process of claim 10, wherein said UUV is launched or retrieved from a platform, drilling structure, an ice breaker, ice management ship, an underwater docking station, a shore based docking station, artificial island, remote station, or combinations thereof.

15. The process of claim 10, wherein said ice floe survey provides approximately 1, 2, 3, 4, 5, 7.5, 10, 12.5, 15, 18, 24, 48 or 72 hour warnings of incoming ice floes.

16. The process of claim 10, wherein said ice floes are classified based on risk including one or more of the following: speed, mass, density, age, trajectory, currents, weather, predicted path, and other environmental features.

17. The process of claim 10, wherein satellite imagery and analysis of satellite images are coupled with UUV monitoring of ice floes, including calculation of one or more of the following: speed, mass, density, age, trajectory, currents, weather, predicted path, and other environmental features.

18. The process of claim 10, wherein said system comprises an automated alert system that includes one or more of actions including: warning the drilling structure of probable contact with an ice floe, instructing one or more ice breakers to respond to possible contact with an ice floe, instructing personnel on the drilling structure to cease drilling operations in response to possible contact with an ice floe, instructing personnel on the drilling structure to evacuate in response to probable contact with an ice floe, monitoring ice floe approach, monitoring personnel response, monitoring drilling shut down, or monitoring well head uncoupling.

19. A remote ice floe monitoring system comprising:
a) a drilling structure with a tether comprising one or more unmanned underwater vehicle (UUV) docking stations;
b) one or more unmanned underwater vehicles (UUV) containing ice floe survey equipment; and
c) a docking station for receiving data from said one or more UUV docking stations,
wherein said UUV comprises an electric motor, one or more batteries, one or more control processors, and one or more data storage devices, and said one or more UUV docking station connects with one or more UUVs said connection comprising a power connection and a data connection to transmit ice floe survey information from said UUV to said UUV docking station.

20. The system of claim 19, wherein said one or more UUV comprises one or more components selected from the group consisting of automated obstacle avoidance systems, on-board positioning systems, sonar sensors, processors, antennae, global positioning systems (GPS), long term and short term data storage, removable media, camera, avoidance systems, location systems, echo-locators, or homing systems.

21. The system of claim 19, wherein said ice floe survey equipment selected from the group consisting of laser imaging detection and ranging (LIDAR), sound navigation and ranging (SONAR), upward looking SONAR (ULS), backscatter, and combinations thereof.

22. The system of claim 19, wherein said one or more batteries consist of alkaline batteries, lithium batteries, or long life batteries.

23. The system of claim 19, wherein said UUV is launched or retrieved from a platform, drilling structure, an ice breaker, ice management ship, an underwater docking station, a shore based docking station, artificial island, remote station, or combinations thereof.

24. The system of claim 19, wherein said ice floe survey provides approximately 1, 2, 3, 4, 5, 7.5, 10, 12.5, 15, 18, 24, 48 or 72 hour warnings of incoming ice floes.

25. The system of claim 19, wherein said ice floes are classified based on risk including one or more of the following: speed, mass, density, age, trajectory, currents, weather, predicted path, and other environmental features.

26. The system of claim 19, wherein satellite imagery and analysis of satellite images are coupled with UUV monitoring of ice floes, including calculation of one or more of the following: speed, mass, density, age, trajectory, currents, weather, predicted path, and other environmental features.

27. The system of claim 19, wherein said system comprises an automated alert system that includes one or more of actions including: warning the drilling structure of probable contact with an ice floe, instructing one or more ice breakers to respond to possible contact with an ice floe, instructing personnel on the drilling structure to cease drilling operations in response to possible contact with an ice floe, instructing personnel on the drilling structure to evacuate in response to probable contact with an ice floe, monitoring ice floe approach, monitoring personnel response, monitoring drilling shut down, or monitoring well head uncoupling.

* * * * *